Patented Nov. 17, 1925.

1,561,781

UNITED STATES PATENT OFFICE.

WILLIAM FAEHNDRICH, OF BROOKLYN, NEW YORK.

PROCESS OF TREATING CHEESE.

No Drawing. Application filed August 4, 1923. Serial No. 655,745.

*To all whom it may concern:*

Be it known that I, WILLIAM FAEHNDRICH, a citizen of Germany, residing at Brooklyn, in the county of Kings and State of New York, have invented certain new and useful Improvements in Processes of Treating Cheese, of which the following is a specification.

This invention relates to an improved process of remaking cheese and has for its object to provide a process, whereby any kind of cheese found on the market and of over a few days old to two years old can be remade into a palatable cheese free from disease bacteria and not liable to decay.

I am aware of several attempts to remake cheese by sterilization processes. It is well known that different bacteria can stand different temperatures and that while some bacteria may be killed by intense heat, others are killed only by intense cold. It is also well known that some spores in the cells that produce bacteria can be killed only at a temperature above 212° F. In experimenting, I have found that the heretofore used sterilization processes are not adequate to and do not produce bacteria-proof cheese.

On the other hand, according to my method, the disease bacteria are not killed by sterilization, but by a special bacteria destroying culture added to the cheese and which additionally has the advantage of imparting to the cheese the particular flavor or piquancy desired.

To carry out this method, cheese of any kind as found on the market of from a few days to two years old, after removing whatever covering it has or thoroughly cleaning it on the outside, is first cut up into pieces of suitable size. Then these pieces are put into a vat containing distilled water and are heated to a temperature of about 120° F. and maintained at such temperature until they are converted into a thick doughlike mass. To this mass I add an alkali rich salt, such as salt of lime, and milk sugar in suitable proportions. I found milk sugar (about ⅛%) to be an essential ingredient as constituting the food for the pure culture. On cooling this mass down to a temperature of about 100° F., I add a pure culture, such as sprouting fungi, *Bacillus Bulgaricus*, *Penicillium-Glaucium* or other culture, about one grain in 100 lbs. of the mass. I have found that this pure culture, when added to the mass, produces several very important results.

In the first place, the culture developing in the milk sugar very rapidly kills off whatever disease bacteria and spores remain in the mass after heating and as it continues to grow or reproduce, it prevents the reappearance of disease bacteria.

Secondly, I have discovered that cultures contribute to a great extent to the production of certain flavors in the cheese and that the flavor varies with the particular culture used. Thus for instance, the sprouting fungi, owing to their continuous growth, maintain the mass in a soft condition and the cheese treated with this kind of culture is converted into one that is very much like a Camembert or Brie cheese both in character and flavor. By using a different culture, such as *Bacillus Bulgaricus*, a cheese with a strong piquant flavor somewhat like Roquefort is produced.

While the mass inoculated with the pure culture mentioned is still in a hot state, it is put in packages. Large loaves or cakes are put in molds lined with cloth. On removing the enveloped mass from the mold, the cloth is folded all around the same forming a package. Then this package is sealed by dipping it in paraffine.

The cheese thus produced, when sufficiently cooled, is ready for consumption. Curing of the cheese is entirely dispensed with. I have found that the cheese remade according to my new process can be used under all climatic conditions and will keep for a considerable length of time without any danger of decay.

What I claim is:—

1. The method herein described of treating cheese consisting in converting existing cheese into a doughlike mass, adding to said mass milk sugar, then inoculating it with a pure culture of the type of *Bacillus Bulgaricus* and packing said mass in sealed packages.

2. The method herein described of treating cheese consisting in converting existing cheese in a water bath into a doughlike mass, adding to said mass salt and milk sugar in suitable proportions, then inoculating said mass with a pure culture of the type of *Bacillus Bulgaricus*.

3. The method herein described of treating cheese consisting in first cutting the cheese in small pieces, then treating these pieces in a hot bath until a doughlike mass is obtained, then adding to it an alkaline salt and milk sugar, inoculating the mass, while in a hot state, with a pure culture of the type of *Bacillus Bulgaricus* and enclosing the same in sealed packages.

In testimony whereof I affix my signature.

WILLIAM FAEHNDRICH.